J. T. RICE.
FEED BAG.
APPLICATION FILED SEPT. 24, 1914.
1,176,315.
Patented Mar. 21, 1916.
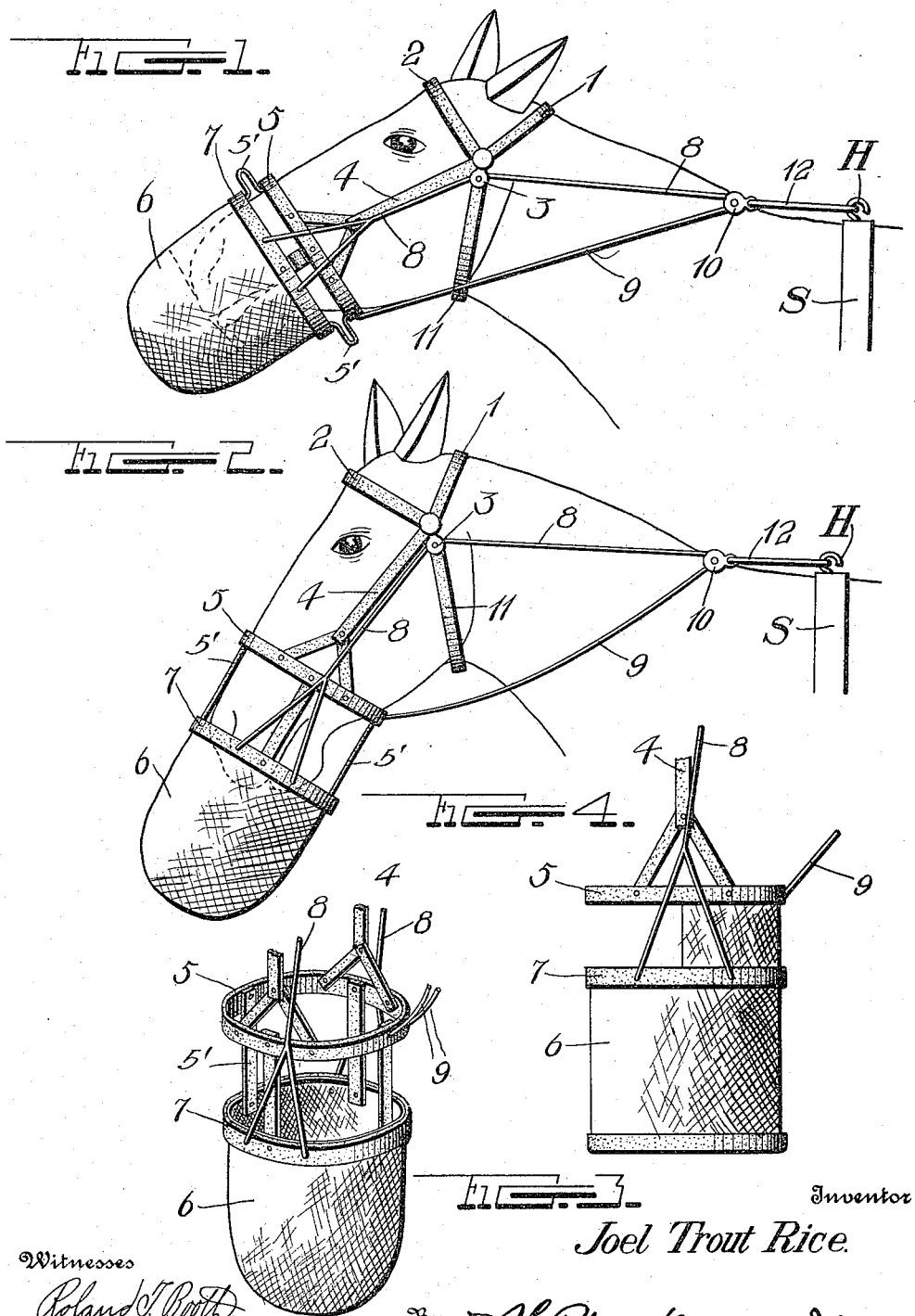
Inventor
Joel Trout Rice.

UNITED STATES PATENT OFFICE.

JOEL TROUT RICE, OF NEW YORK, N. Y.

FEED-BAG.

1,176,315.  Specification of Letters Patent.  Patented Mar. 21, 1916.

Application filed September 24, 1914. Serial No. 863,329.

*To all whom it may concern:*

Be it known that I, JOEL TROUT RICE, a citizen of the United States, residing at New York, in the county of New York and State of New York, have invented certain new and useful Improvements in Feed-Bags; and I do declare the following to be a full, clear, and exact description of the invention, such as will enable others skilled in the art to which it appertains to make and use the same.

This invention relates to feed bags commonly known as "nose bags" and which are applied to an animal's head in such a manner as to enable him to reach the contents.

The object of the invention is to provide a device of this character so constructed and supported that the horse using it will never lift his nose above the top of the bag and yet is supplied with fresh air for breathing while eating and which is provided with means for drawing the bag up to the horse's mouth on a slight forward or downward movement of his head.

With the above and other objects in view, the invention consists of certain novel features of construction, combination and arrangement of parts as will be more fully described and claimed.

In the accompanying drawings: Figure 1 is a side elevation of this improved feed bag applied and showing the horse's head in raised position to cause the feed in the bag to be lifted to his mouth; Fig. 2 is a similar view with the animal's head shown in the position which he assumes while eating. Fig. 3 is a perspective view of the attachment detached; Fig. 4 is a side elevation showing a slightly different form of bag.

In the embodiment illustrated 1 designates the head strap and 2 the brow band which is connected with the ends of the head strap. Pulleys 3 are provided on the ends of the head strap 1 and are designed for a purpose to be described.

The feed bag herein shown comprises a suspension band 5 which is adapted to encircle the head of the horse above his mouth, and which is connected by flexible straps 5' or otherwise with a feed bag proper 6 of any suitable or desired construction, said bag 6 being here shown provided at its upper end with a band 7 with which the suspension band 5 is connected by the straps 5'. The bands 5 and 7 are spaced apart a suitable distance to provide free access of air for breathing purposes when the horse's head is in normal chewing position, as shown in Fig. 2.

In Fig. 4, the feed bag is constructed similar to that shown in Figs. 1 to 3 with the exception that the bands 5 and 7 are connected at their rear portion by the fabric from which the bag 6 is constructed, an opening being left only at the front portion of the bag between the two bands for supplying air during the feeding operation.

Straps or other flexible elements 4 connect the suspension band 5 with the head strap 1 being positioned to lie along the cheeks of the horse when applied as shown clearly in Figs. 1 and 2. Flexible elements 8 are shown with one end connected to the band 7 of the feed bag 6 and extend over the pulleys 3 on the head gear and over pulleys 10 mounted on a cord or strap 12 adapted to be engaged with a hook or terret H on the harness saddle S which is provided on all harness for connection of the check rein. The other end 9 of the flexible element 8 is connected with the band 5 at its rear portion between the straps 4 and is designed to support the rear portion of the bag.

In the use of this device, the harness bridle is first removed and the head gear of this feeding apparatus is applied as a substitute therefor and which may be secured on the animal's head by a throat strap 11 such as is ordinarily used on halters and bridles although this strap is not essential. After the bag has been engaged with the horse's head by passing the band 5 around it and positioning it above his mouth, the flexible element 12 is engaged with the terret or hook H on the harness saddle and the horse is then ready to eat, it being understood that oats or other food have been first supplied to the bag before it is applied to the horse's head. With the parts in the position above described, a slight forward or downward movement of the horse's head will exert a pull on end 9 of cord 8 and exert a drawing action on bag 6 and cause the feed therein to move upwardly or outwardly in accessible position to the mouth of the horse and after he has taken a mouthful, he will raise his head into natural position for chewing as shown in Fig. 2 and in this position, his nostrils will be disposed opposite openings between the bands 5 and 7 and thus fresh air will be supplied to him while eating.

From the above description, taken in connection with the accompanying drawing, it will be noted that the device provides a substantially automatic feeding mechanism or bridle comprising few parts which may be easily and quickly secured upon the animal and which will reliably supply feed to the animal as he requires it.

I claim as my invention:

A feed bag comprising a halter, a pair of cheek straps connected thereto adapted to lie one on each side of the horse's head, diverging arms formed at their free ends, a pulley secured to each at the opposite ends of said straps, a flat suspension band adapted to encircle an animal's head above its nostrils, said band being secured at opposite sides to the free ends of the diverging arms of said cheek straps, a feed bag spaced from said suspension band and arranged in a plane below it, flexible straps connected at intervals by their opposite ends to said suspension band and said feed bag, for holding them in spaced relation, a terret engaging cord provided with a pair of pulleys, bag elevating cords passing over the pulleys on said terret engaging cord and the first mentioned pulleys, said bag elevating cords each having one end bifurcated and secured to the edge of the bag at one side thereof substantially in alinement with the connection of the suspension band with the cheek strap, whereby the band is comfortably supported on the animal and held against tilting movement when in any position, the free ends of said cords being secured together to the suspension band at a point beneath the neck of the horse.

In testimony whereof I have hereunto set my hand in presence of two subscribing witnesses.

JOEL TROUT RICE.

Witnesses:
 CHAS. SCHANO,
 FRANCIES TIERNAN.

Copies of this patent may be obtained for five cents each, by addressing the "Commissioner of Patents, Washington, D. C."